(12) United States Patent
Banavalikar et al.

(10) Patent No.: US 8,837,476 B2
(45) Date of Patent: Sep. 16, 2014

(54) OVERLAY NETWORK CAPABLE OF SUPPORTING STORAGE AREA NETWORK (SAN) TRAFFIC

(75) Inventors: Bhalachandra G. Banavalikar, Cupertino, CA (US); Keshav G. Kamble, Fremont, CA (US); Renato J. Recio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 13/607,572

(22) Filed: Sep. 7, 2012

(65) Prior Publication Data

US 2014/0071983 A1 Mar. 13, 2014

(51) Int. Cl.
*H04L 12/28* (2006.01)

(52) U.S. Cl.
USPC .......................................................... 370/389

(58) Field of Classification Search
USPC .......................................................... 370/389
See application file for complete search history.

(56) References Cited

U.S. PATENT DOCUMENTS

| | | | |
|---|---|---|---|
| 7,155,494 B2 | 12/2006 | Czeiger et al. | |
| 7,366,784 B2 | 4/2008 | Ishizaki | |
| 7,827,317 B2 | 11/2010 | Baldwin et al. | |
| 2003/0200247 A1 | 10/2003 | Banzhaf et al. | |
| 2011/0026527 A1 | 2/2011 | Shao et al. | |
| 2011/0188511 A1 | 8/2011 | Di Benedetto | |
| 2011/0261828 A1* | 10/2011 | Smith | 370/401 |
| 2012/0177043 A1* | 7/2012 | Berman | 370/392 |
| 2012/0324444 A1* | 12/2012 | Gulati et al. | 718/1 |
| 2013/0019277 A1* | 1/2013 | Chang et al. | 726/1 |
| 2013/0028135 A1* | 1/2013 | Berman | 370/254 |
| 2013/0061224 A1* | 3/2013 | Reumann et al. | 718/1 |
| 2014/0056298 A1* | 2/2014 | Vobbilisetty et al. | 370/355 |
| 2014/0092898 A1* | 4/2014 | Berman | 370/359 |

OTHER PUBLICATIONS

Mahalingam et al., "VXLAN: A Framework for Overlaying Virtualized Layer 2 Networks over Layer 3 Networks," Network Working Group, Aug. 26, 2011.
Kreeger et al., "Network Virtualization Overlay Control Protocol Requirements," Internet Engineering Task Force, Jan. 30, 2012.

* cited by examiner

*Primary Examiner* — Asad Nawaz
*Assistant Examiner* — Syed S Ali
(74) *Attorney, Agent, or Firm* — Zilka-Kotab, PC

(57) ABSTRACT

In one embodiment, a system includes a server having a hypervisor layer that includes an overlay-capable virtual switch and a Fiber Channel (FC) virtual switch; at least one processor adapted for executing logic; and a converge network adapter (CNA) coupled to the hypervisor, the CNA being adapted for communicating with the overlay-capable virtual switch and the FC virtual switch, wherein the CNA is adapted for communicating with a FC forwarder (FCF), and the overlay-capable virtual switch includes logic adapted for communicating with a central controller.

14 Claims, 11 Drawing Sheets

OVERLAY NETWORK CAPABLE OF SUPPORTING STORAGE AREA NETWORK (SAN) TRAFFIC

BACKGROUND

The present invention relates to data center infrastructure, and more particularly, this invention relates to supporting Storage Area Network (SAN) traffic over logical overlay networks and systems thereof.

Network virtualization is an emerging data center and cloud computing trend which aims to virtualize a network as seen by end stations in a way that greatly simplifies network provisioning in multi-tenant environments, as well as traditional environments. One of the more common techniques of achieving network virtualization is to use network overlays, where tunnels are established between servers, edge network switches, and gateways to which end stations connect. The tunnel is actually implemented by encapsulating packets transmitted by a source end station into an overlay header that transports the packet from the source switch to a target switch in user datagram protocol (UDP) transport via an internet protocol (IP)-based network. The overlay header includes an identifier (ID) that uniquely identifies the virtual network. The target switch strips off the overlay header encapsulation, UDP transport header, and IP header, and delivers the original packet to the destination end station. In addition to this tunneling mechanism, the edge switches participate in an address discovery protocol, which may be learning/flooding based, or lookup-based.

Overlay networks typically utilize an overlay-enabling technology, such as Virtual eXtensible Local Area Network (VXLAN), Locator/ID Separation Protocol (LISP), Overlay Transport Virtualization (OTV), Network Virtualization using Generic Routing Encapsulation (NVGRE), etc. Regardless of the overlay network supporting protocol, an overlay network connects geographically separated Layer-2 (L2) networks using L2 over Layer-3 (L3) tunnels. L2 packets originated by a virtual machine (VM) in an overlay network capable server and destined to another VM or group of VMs in same overlay network, but located in another physical location (such as on a different physical server) are carried over L3 tunnels, bypassing the L2 infrastructure.

Overlay networks allow stretching of VM mobility across L2 domains for VMs running Enterprise applications (typically built on top of IP over Ethernet). However, none of these technologies directly provide the benefits of overlay network usage to VMs exchanging SAN traffic, such as Fibre Channel over Ethernet (FCoE) traffic, Small Computer System Interface (SCSI), etc. For example, in conventional systems, flows of SAN traffic through the underlying network are separated from the flows of Enterprise Ethernet traffic thereby preventing the SAN traffic from taking advantage of the overlay networks. Therefore, it would be beneficial to have an overlay network which is capable of providing similar capabilities to SAN traffic as it does to IP traffic.

SUMMARY

In one embodiment, a system includes a server having a hypervisor layer that includes an overlay-capable virtual switch and a Fibre Channel (FC) virtual switch, at least one processor adapted for executing logic, and a converge network adapter (CNA) coupled to the hypervisor, the CNA being adapted for communicating with the overlay-capable virtual switch and the FC virtual switch, wherein the CNA is adapted for communicating with a FC forwarder (FCF), and the overlay-capable virtual switch includes logic adapted for communicating with a central controller.

In yet another embodiment, a computer program product includes a computer readable storage medium having computer readable program code embodied therewith, the computer readable program code including computer readable program code configured for receiving a block of MAC addresses for use in local FIP operations, and computer readable program code configured for advertising to all local FCoE initiators to route FCoE traffic to a FC virtual switch by asserting the overlay-capable virtual switch as a FCF for any requesting FCoE initiators.

According to yet another embodiment, a system includes a server that includes a hypervisor layer having an overlay-capable virtual switch and a FC virtual switch, at least one processor adapted for executing logic, and a CNA coupled to the hypervisor, the CNA being adapted for communicating with the overlay-capable virtual switch and the FC virtual switch, wherein the CNA is adapted for communicating with a FCF. The overlay-capable virtual switch includes logic adapted for communicating with a Distributed Overlay Virtual Ethernet (DOVE) controller, logic adapted for receiving a block of MAC addresses for use in local FIP operations from the DOVE controller, and logic adapted for advertising to all local FCoE initiators to route FCoE traffic to the server by asserting the overlay-capable virtual switch as a FCF for any requesting FCoE initiators.

Other aspects and embodiments of the present invention will become apparent from the following detailed description, which, when taken in conjunction with the drawings, illustrate by way of example the principles of the invention.

DETAILED DESCRIPTION

Figure 1:
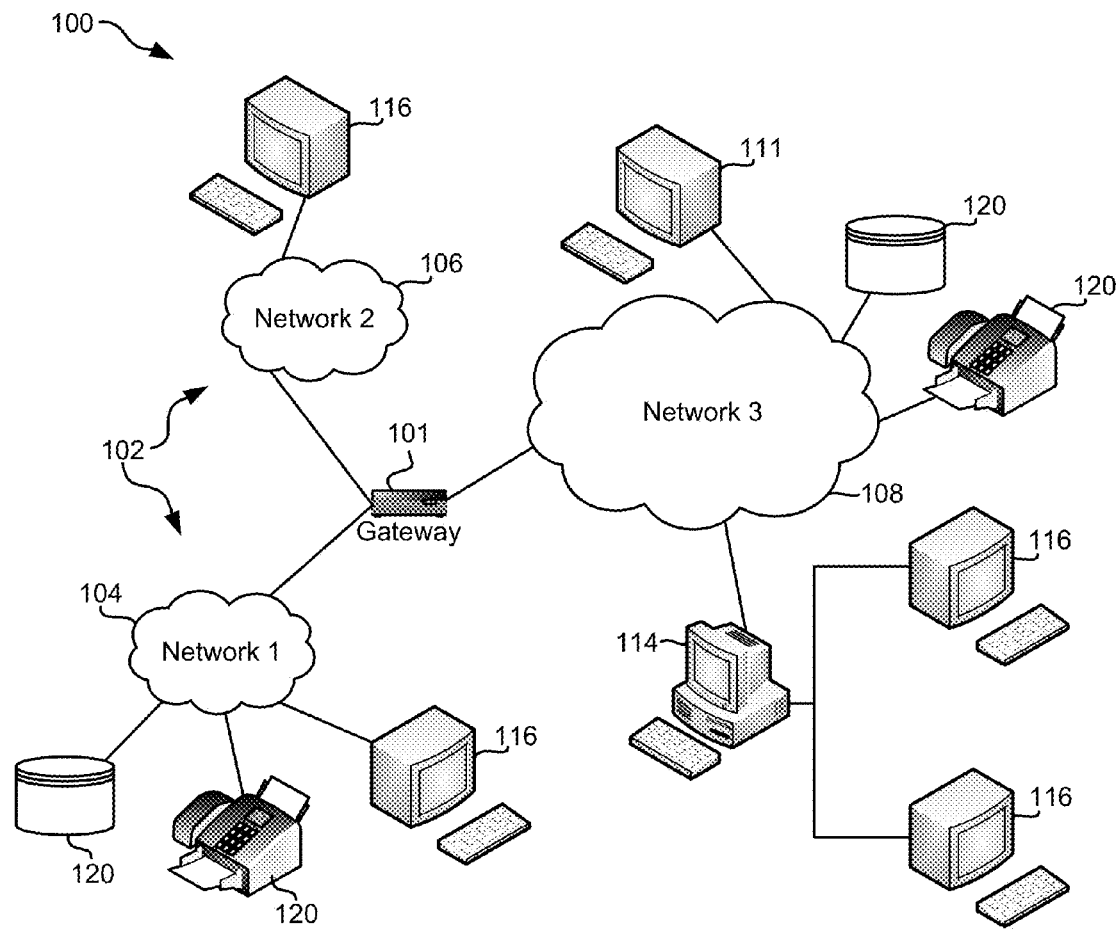
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one approach, Storage Area Network (SAN) data frames may be embedded into an overlay header and routed over an overlay network to a destination where the overlay header is stripped off and the original SAN frames may be delivered to a destination virtual machine (VM) or SAN target. The overlay network may utilize any suitable overlay technology, such as Virtual eXtensible Local Area Network (VXLAN), Locator/ID Separation Protocol (LISP), Overlay Transport Virtualization (OTV), Network Virtualization using Generic Routing Encapsulation (NVGRE), etc. Also, the SAN data frames may use any suitable communication technology, such as Fibre Channel over Ethernet (FCoE), Small Computer System Interface (SCSI), etc. The embodiments and approaches described herein are not limited to any specific overlay technology or any specific SAN communication technology.

In one general embodiment, a system includes a server having a hypervisor layer that includes an overlay-capable virtual switch and a Fibre Channel (FC) virtual switch, at least one processor adapted for executing logic, and a converge network adapter (CNA) coupled to the hypervisor, the CNA being adapted for communicating with the overlay-capable virtual switch and the FC virtual switch, wherein the CNA is adapted for communicating with a FC forwarder (FCF), and the overlay-capable virtual switch includes logic adapted for communicating with a central controller.

In another general embodiment, a method for sending FCoE traffic over an overlay network includes receiving a block of media access control (MAC) addresses for use in local fabric initialization protocol (FIP) operations and advertising to all local FCoE initiators to route FCoE traffic to a server by asserting an overlay-capable virtual switch within the server as a FCF for any requesting FCoE initiators.

In yet another general embodiment, a computer program product includes a computer readable storage medium having computer readable program code embodied therewith, the computer readable program code including computer readable program code configured for receiving a block of MAC addresses for use in local FIP operations, and computer readable program code configured for advertising to all local FCoE initiators to route FCoE traffic to a FC virtual switch by asserting the overlay-capable virtual switch as a FCF for any requesting FCoE initiators.

According to yet another general embodiment, a system includes a server that includes a hypervisor layer having an overlay-capable virtual switch and a FC virtual switch, at least one processor adapted for executing logic, and a CNA coupled to the hypervisor, the CNA being adapted for communicating with the overlay-capable virtual switch and the FC virtual switch, wherein the CNA is adapted for communicating with a FCF. The overlay-capable virtual switch includes logic adapted for communicating with a Distributed Overlay Virtual Ethernet (DOVE) controller, logic adapted for receiving a block of MAC addresses for use in local FIP operations from the DOVE controller, and logic adapted for advertising to all local FCoE initiators to route FCoE traffic to the server by asserting the overlay-capable virtual switch as a FCF for any requesting FCoE initiators.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-Ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fiber, etc.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), any virtual networks, or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a VLAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
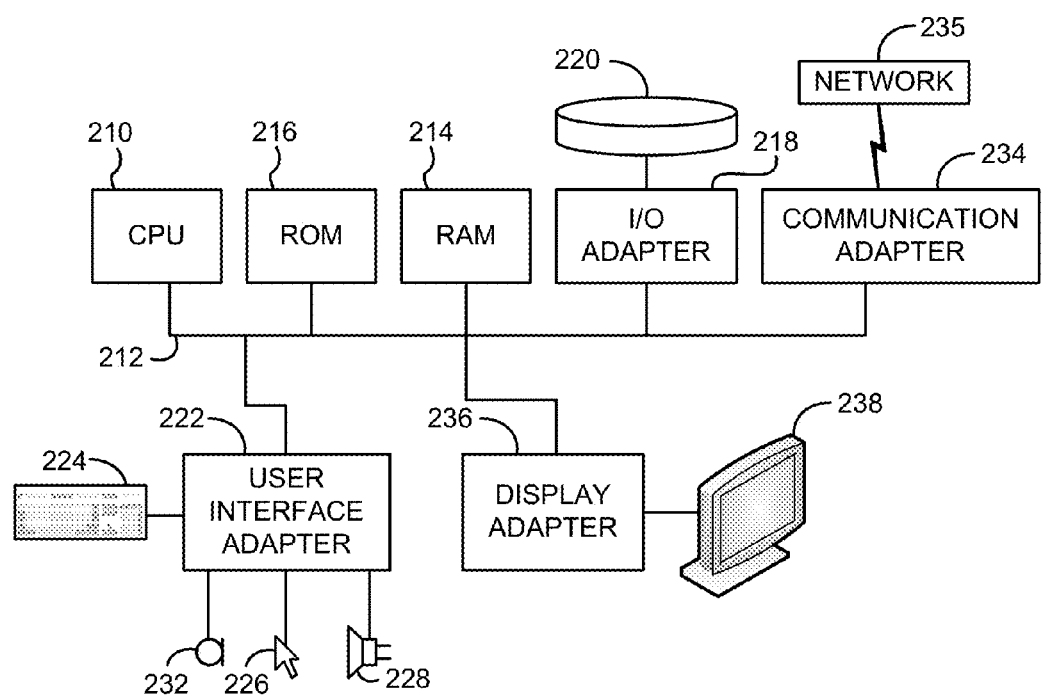
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit (CPU) 210, such as a microprocessor, and a number of other units interconnected via one or more buses 212 which may be of different types, such as a local bus, a parallel bus, a serial bus, etc., according to several embodiments. Other types of processors may also be used, such as an integrated circuit (IC), an application specific integrated circuit (ASIC), a field programmable gate array (FPGA), or any other type of processor known in the art.

The workstation shown in FIG. 2 includes a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
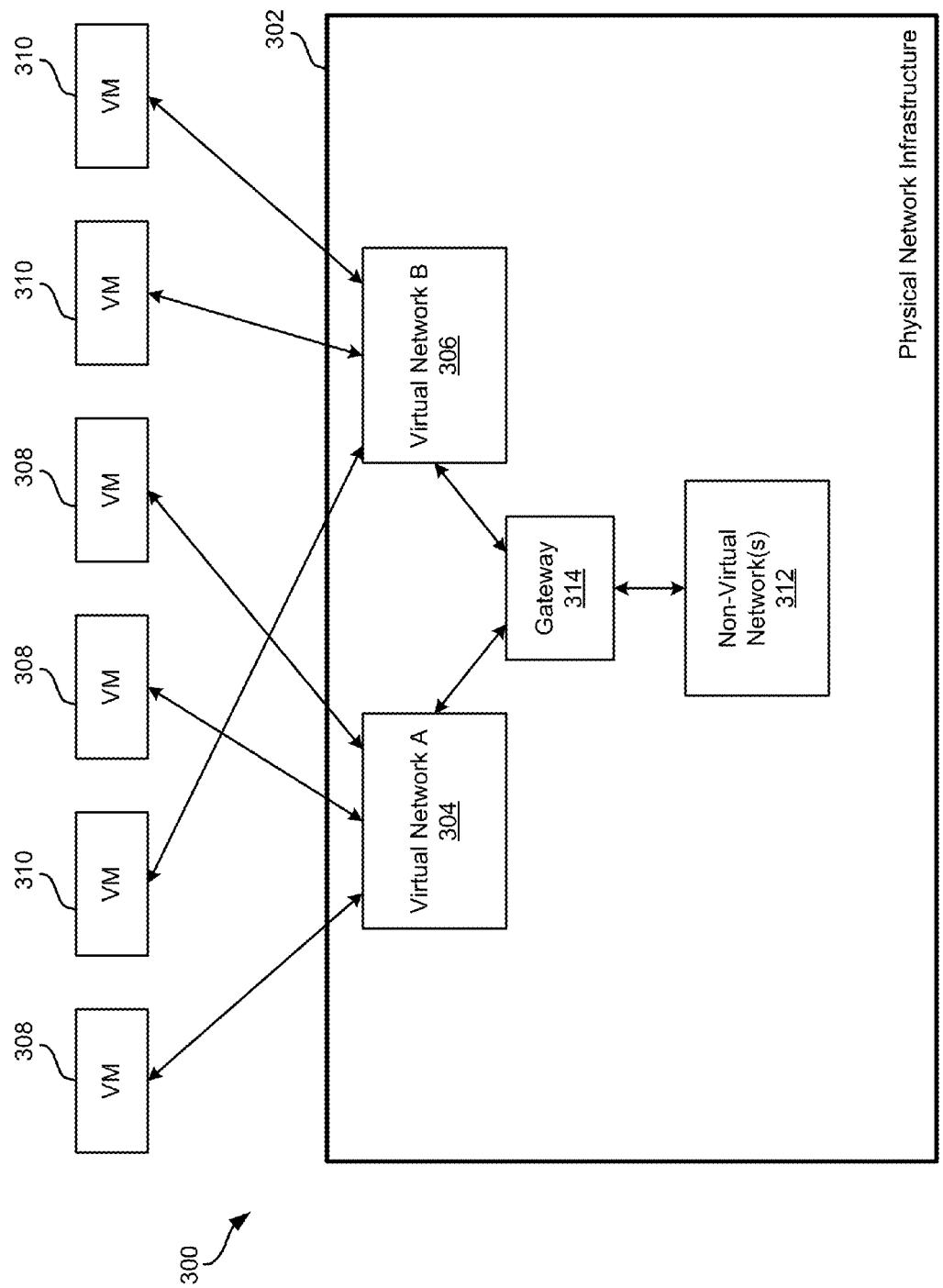
FIG. 3 is a simplified diagram of a virtualized data center, according to one embodiment.

Referring now to FIG. 3, a conceptual view of an overlay network 300 is shown according to one embodiment. In order to virtualize network services, other than simply providing a fabric path (connectivity) between devices, services may be rendered on packets as they move through the gateway 314 which provides routing and forwarding for packets moving between the non-virtual network(s) 312 and the Virtual Network A 304 and Virtual Network B 306. The one or more virtual networks 304, 306 exist within a physical (real) network infrastructure 302. The network infrastructure 302 may include any components, hardware, software, and/or functionality typically associated with and/or used in a network infrastructure, including, but not limited to, switches, connectors, wires, circuits, cables, servers, hosts, storage media, operating systems, applications, ports, I/O, etc., as would be known by one of skill in the art. This network infrastructure 302 supports at least one non-virtual network 312, which may be a legacy network.

Each virtual network 304, 306 may use any number of VMs 308, 310. In one embodiment, Virtual Network A 304 includes one or more VMs 308, and Virtual Network B 306 includes one or more VMs 310. As shown in FIG. 3, the VMs 308, 310 are not shared by the virtual networks 304, 306, but instead are exclusively included in only one virtual network 304, 306 at any given time.

According to one embodiment, the overlay network 300 may tunnel through one or more cell switched domain scalable fabric components (SFCs) interconnected with one or more distributed line cards (DLCs).

Components of an overlay network 300 typically identify where to route packets based on a virtual network identifier, referred to as a VNI or VNID. This is typically a 24-bit code or number, which excludes 0x0 and 0xFFFFFF. The overlay network 300 has the capability of tunneling L2 packets over the L3 network by encapsulating the L2 packets into an overlay header. This may be performed using VXLAN or some other overlay capable protocol, such as NVGRE, LISP, OTV, etc. The packet may also be encapsulated in a user datagram protocol (UDP) and internet protocol (IP) UDP/IP header.

The overlay network 300 may include one or more point-to-point tunnels, and/or point-to-multipoint tunnels. In addition, any of these tunnels may be created, removed, altered and modified based on any number of factors, such as new devices being added to the overlay network 300, removal of devices from the overlay network 300, startup of any end devices, i.e., devices managing tunnel end points, such as virtual overlay network gateways, Hypervisors, switches capable of overlay functionality, etc. In order for a device to manage a tunnel, there needs to be a mapping between an original packet's source address, destination address, and a tunnel identifier. In this way, a physical server is capable of forwarding the encapsulated original packet to the proper destination device.

Figure 4:
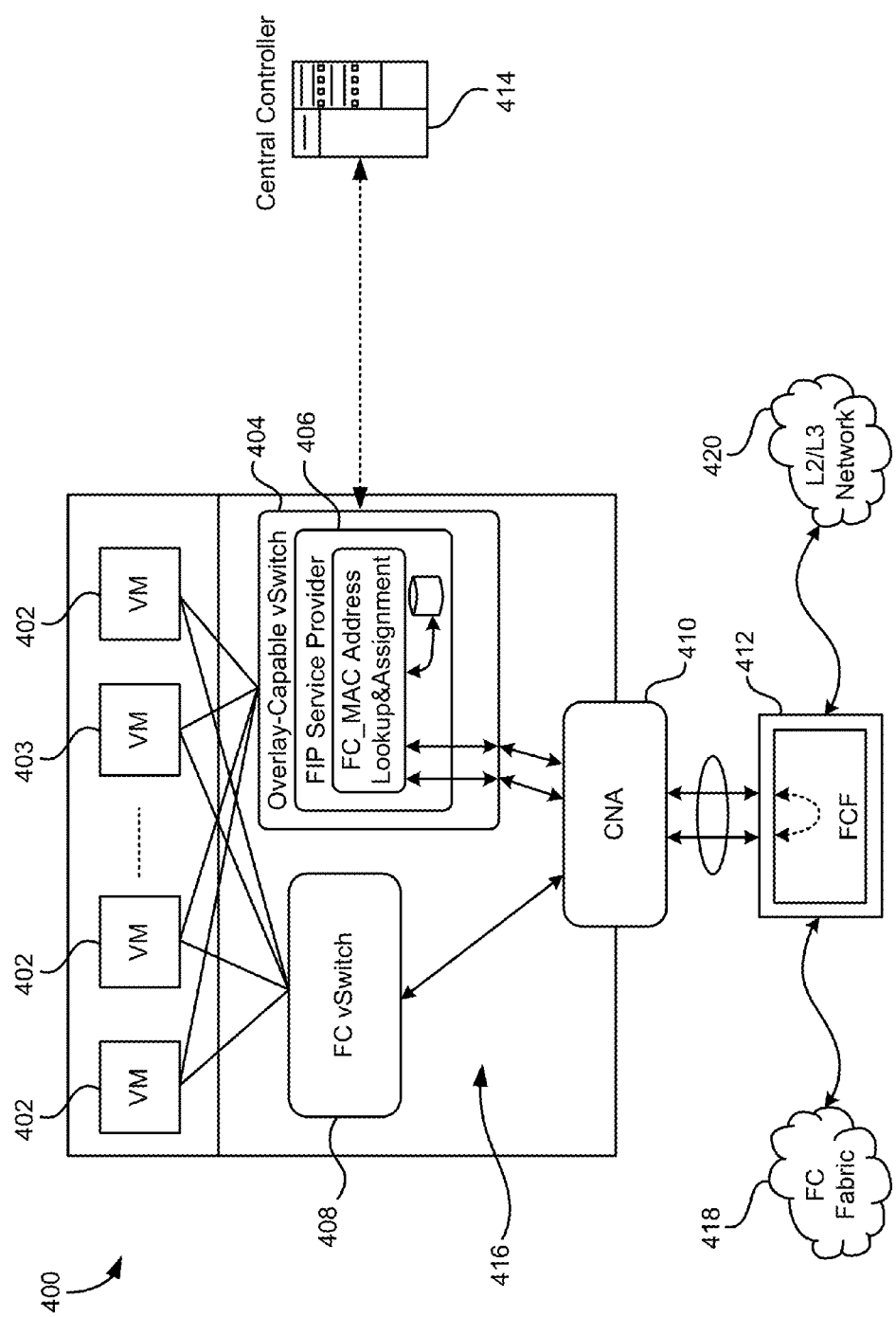
FIG. 4 shows a fabric initialization protocol (FIP) sequence in a system, according to one embodiment.

Now referring to FIG. 4, a virtualized server system 400 is shown according to one embodiment. The system 400 comprises a plurality of VMs 402, each VM capable of generating storage traffic (across a SAN), such as FCoE, SCSI, or some other Ethertype that is non-IP based, as well as Enterprise networking traffic, such as TCP/IP traffic. VMs 402 generating Enterprise network traffic are connected to an overlay-capable virtual switch (vSwitch) 404, which may operate according to Distributed Overlay Virtual Ethernet (DOVE) standards or according to some other applicable policy, standard, or protocol, as would be understood by one of skill in the art.

The overlay-capable vSwitch 404 may be embedded as part of a Hypervisor layer 416 in the system 400. The Hypervisor layer 416 may also provide logical instances of a Fibre Channel (FC) Host Bus Adapter (HBA), which may be part of converged network adapter (CNA) 410, which may be represented as a FC vSwitch 408, to communicate with each of the VMs 402 that are capable of generating storage traffic.

The CNA 410 is connected to a Fibre Channel Forwarder (FCF) 412, which may be connected to a FC fabric 418 and a L2/L3 Network 420 which may be used to support the overlay network, in some approaches.

During a Fabric Initialization Protocol (FIP) sequence, the overlay-capable vSwitch 404 retrieves a block of Media Access Control (MAC) addresses from a DOVE Controller 414 for FCoE local MAC assignments and asserts itself as the FCF for requesting FCoE Initiators, according to one embodiment. During the FIP sequence, a DOVE FIP service provider 406 satisfies all necessary interactions with a FCoE Initiator.

To guarantee Quality of Service (QoS) for the storage traffic embedded within the overlay network packet format, the following network characteristics may be expected and/or demanded from the physical network. First, the physical network provides end-to-end Data Center Bridging Capability eXchange (DCBX) protocol support for lossless transport of storage traffic across the overlay network; second, the physical network provides differentiated services support for enabling a privileged path through network nodes, as recited in RFC 3140; and third, the physical network enables expedited forwarding support, as recited in RFC 3246.

At a high level, according to one embodiment, overlay encapsulation may set the "Type of Service" (TOS) bits in an IP header of a packet to a highest IP Precedence level (i.e., 7) and a network administrator may configure network nodes to map IP Precedence level of 7 to a "Differentiated Services Code Point" (DSCP) level of "Expedite Forwarding" (EF) or a "Class Selector 6" (CS6) or a "Class Selector 7" (CS7), depending upon IP TOS to DSCP mapping supported on the network node. This mechanism provides a privileged path for the overlay encapsulated storage traffic across the network.

Figure 5:
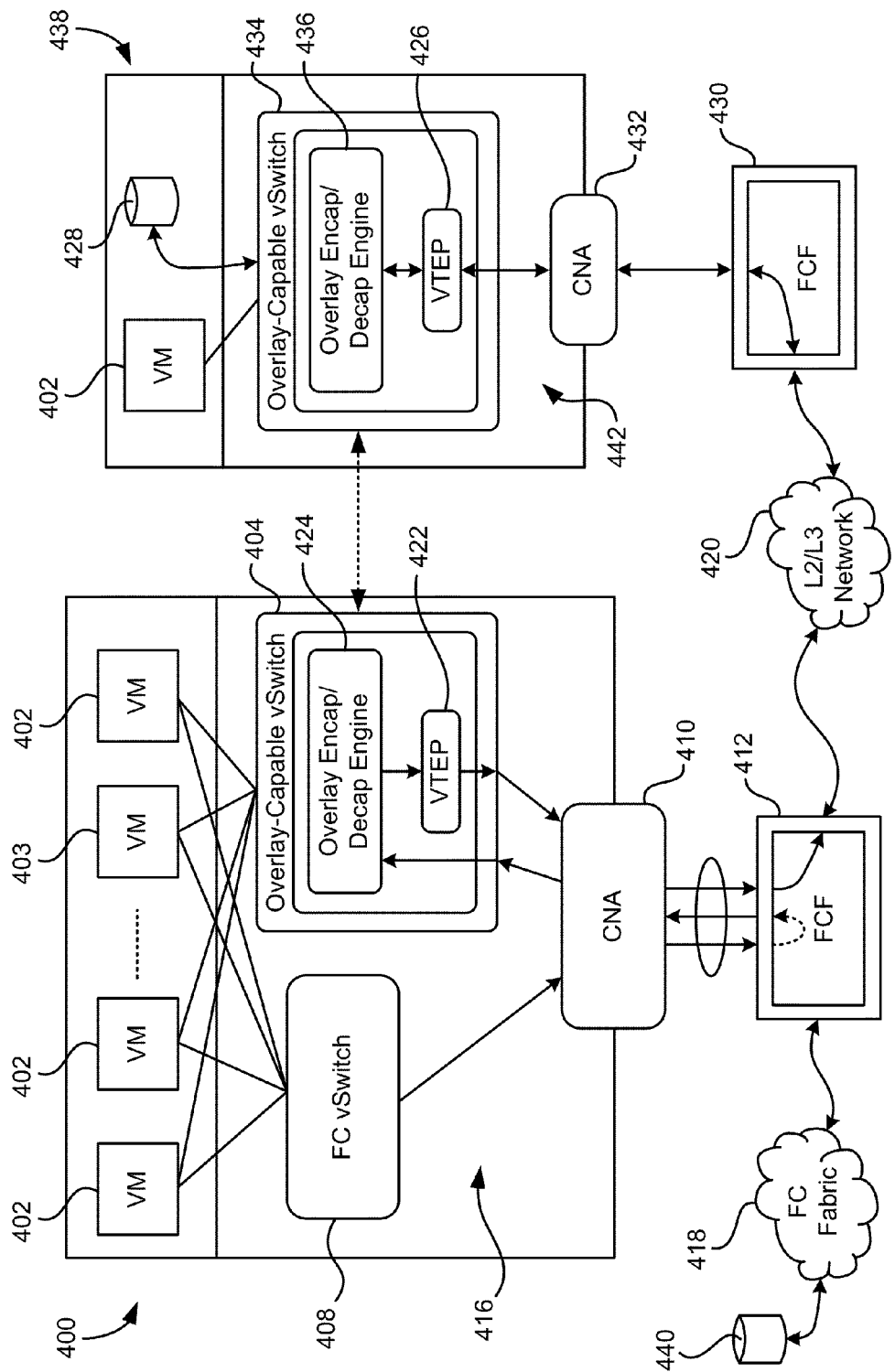
FIG. 5 shows a forward path through the system from a Fibre Channel over Ethernet (FCoE) initiator to a FCoE target, according to one embodiment.

Now referring to FIG. 5, a forward path from a FCoE Initiator 400 to a FCoE Target 428 through the network is shown, according to one embodiment. FC traffic from one of the VMs 403 passes through the Hypervisor layer 416 through an abstracted entity, a Fibre Channel Virtualization Layer (e.g., the FC vSwitch 408), to the CNA 410. The CNA 410 encapsulates the FC traffic into one or more FCoE frames and sends the frame(s) out to the FCF 412. When the source FCF 412 detects when certain conditions of the FCoE frame(s) are met: (i) the FCoE traffic is coming from the attached server 400, and that (ii) the server 400 has overlay enabled (which may be learned through instructions provided via the management plane), the source FCF 412 "hair-pins" the frame(s) back to the same server port from which it was received. The source FCF 412 also modifies the destination information in the frame(s) such that it causes the receiving CNA 410 to pass the frame(s) to the overlay-capable vSwitch 404 which is connected to VMs 402 capable of providing Enterprise traffic. The overlay-capable vSwitch 404 implements Virtual Tunneling End Point (VTEP) 422 for the overlay network for the server 400. When the frame(s) appears at the overlay-capable vSwitch 404 virtual port, the frame(s) is inserted into an overlay encapsulation/de-capsulation engine 424, which encapsulates the frame(s) with an overlay header. Such an overlay header includes all routing level information needed to deliver the frame(s) to the destination VTEP 426. The destination VTEP 426 maps with the FCoE Target 428 address. VTEP addressing and discovery is specific to the type of overlay network being used, and is not described in more detail here.

The overlay-encapsulated FCoE frame(s) is then sent by the overlay-capable vSwitch 404 to the CNA 410 and ultimately exits the system 400 toward the network. The source FCF 412 treats this overlay-encapsulated FCoE frame(s) as a specially privileged Ethernet frame (based on the IP TOS bits) and forwards the overlay-encapsulated FCoE frame(s) to the L2/L3 Network 420. The overlay-encapsulated FCoE frame(s) travel through the L2/L3 Network 420 through a scheduled channel which guarantees QoS through to a destination FCF 430 connected to the destination VTEP 426. The overlay-encapsulated FCoE frame(s) gets routed based on an IP address of the VTEP in its L3 header. The destination FCF 430 takes the overlay-encapsulated FCoE frame(s) out of the L2/L3 network 420 and passes it to the destination CNA 432.

The destination CNA 432 passes the frame to destination VTEP 426, such as through a virtual port of the destination overlay-capable vSwitch 434. Once the overlay-encapsulated FCoE frame(s) appears at the destination overlay-capable vSwitch 434, it is injected into the overlay encapsulation/de-capsulation engine 436, where the overlay header is removed (stripped from the overlay-encapsulated FCoE frame) and the one or more FCoE frames are exposed. Overlay logic in the destination overlay-capable vSwitch 434 then pushes this FCoE frame toward the destination CNA 432, where it exits back into the network toward the destination FCF 430. The destination FCF 430 detects when certain conditions of the FCoE frame are met: (i) the incoming FCoE frame from the server 438 is FCoE, and (ii) overlay is enabled on the server 438. When both conditions (i) and (ii) are met, the destination FCF 430 "hair-pins" the FCoE frame back to the server 438. When the destination CNA 432 receives the FCoE frame, it removes the FC frame from the encapsulated frame and passes the FC frame through the destination Hypervisor 442 to the destination, e.g., the FCoE target 428, a VM 402, or some other FC target 440 to which it is destined.

Figure 6:
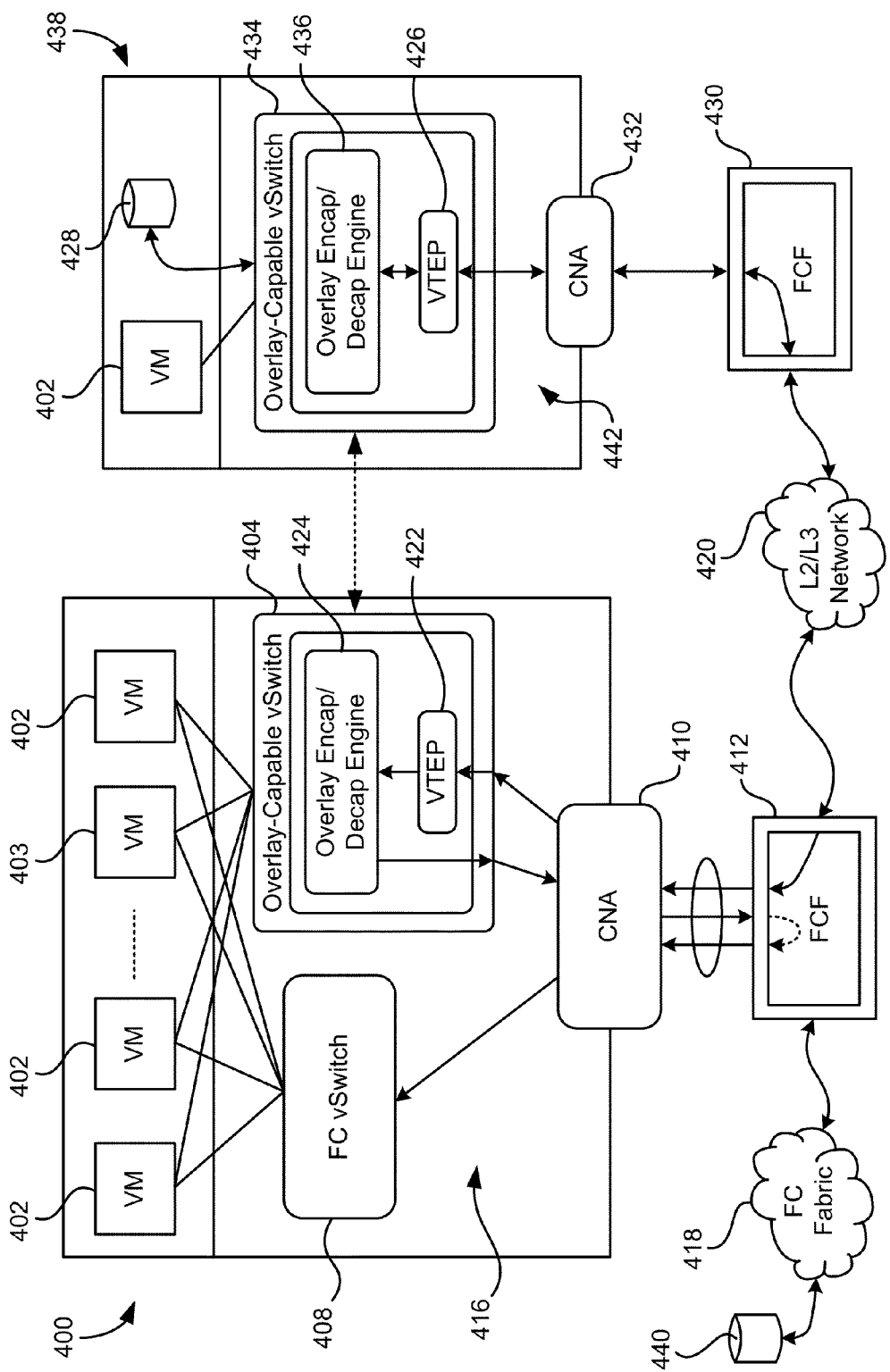
FIG. 6 shows a reverse path through the system from the FCoE target to the FCoE initiator, according to one embodiment.

Now referring to FIG. 6, a reverse path from the FCoE Target 428 to the FCoE Initiator 400 through the network is shown, according to one embodiment. The FC response generated by the FCoE Target 428 traverses through the Hypervisor 442 toward the CNA 432 where it gets encapsulated into a FCoE frame. The CNA 432 then pushes the FCoE frame out to the network toward the FCF 430. The FCF 430 detects that (i) the incoming frame is FCoE, and that (ii) the server 438 has overlay enabled. When both conditions (i) and (ii) are met, the FCF 430 modifies the outer destination MAC for the frame to now be the overlay-capable vSwitch virtual port's MAC address (where FCoE_PM is implemented) and "hair-pins" the FCoE frame back to the CNA 432.

The CNA 432, upon receiving the frame then passes the frame to the overlay virtual port. Once the FCoE frame reaches the overlay virtual port, it is injected into the overlay encapsulation/de-capsulation engine 436. Here, the FCoE frame is encapsulated into an overlay header including all the appropriate destination VTEP information of the source VM 403 (which initiated the Forward Path described in FIG. 4). VTEP addressing and discovery is not described herein, but is dependent on the particular overlay technology used. The overlay-capable vSwitch 434 pushes the overlay-encapsulated frame out toward the CNA 432 once again, and ultimately the frame exits the CNA 432, where it travels back into the network toward the FCF 430. The FCF 430 treats this frame as a specially privileged (based on IP TOS bits) Ethernet frame and forwards the frame to the L2/L3 network 420. The frame travels through the L2/L3 network 420 through a scheduled channel which guarantees QoS through to the original source FCF 412 connected to the source VTEP 422. The FCF 412 takes the frame out of the network and passes it to the source CNA 410.

The source CNA 410 then passes the frame to a virtual port of the overlay-capable vSwitch 404 which implements VTEP. Once the frame appears at the overlay-capable vSwitch 404, it is injected into the overlay encapsulation/de-capsulation engine 424, where the outer overlay header is removed and the FCoE frame is exposed. The overlay-capable vSwitch 404 logic then pushes this FCoE frame southbound toward the CNA 410, where it exits back into the network toward the FCF 412.

The FCF 412 detects that (i) the incoming frame from the server 400 is FCoE and (ii) overlay is enabled on the server 400. When both conditions (i) and (ii) are met, the FCF 412 "hair-pins" the FCoE frame back to the server 400. When the CNA 410 receives the FCoE frame, it removes the FC frame from the FCoE frame and passes the FC frame through the Hypervisor layer 416 to the original source VM 403 to which it is destined.

In order to preserve FC security requirements prevalent on most FC networks and used by SAN Controllers, such as Hard Zoning, Soft Zoning, etc., the following approaches may be used in various embodiments.

Figure 7:
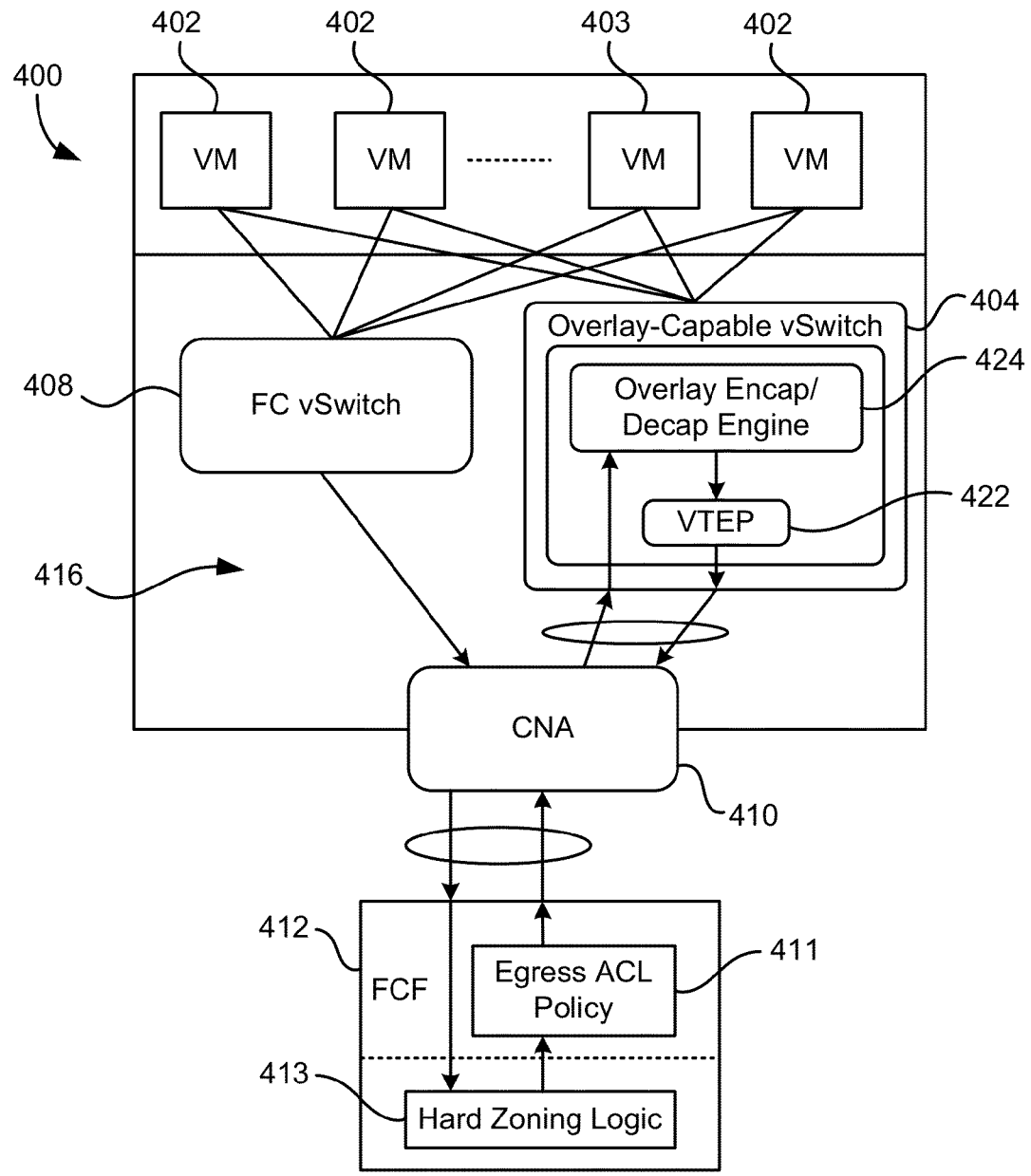
FIG. 7 shows hard zoning in the system, according to one embodiment.

An implementation which accounts for Hard Zoning is shown in FIG. 7, according to one embodiment. In order to account for Hard Zoning, each FCoE frame, as it leaves the CNA 410 and enters the FCF 412, may proceed through Hard Zoning validation logic 413 before "hair-pinning" back into the server 400. Hard Zoning logic 413, according to one embodiment, may examine the FC frame embedded within the FCoE frame. In one embodiment, an Access Control List (ACL) policy 411 may be applied at an egress port of the FCF 412 to "hair-pin" the FCoE frame back to the originating server 400.

Figure 8:
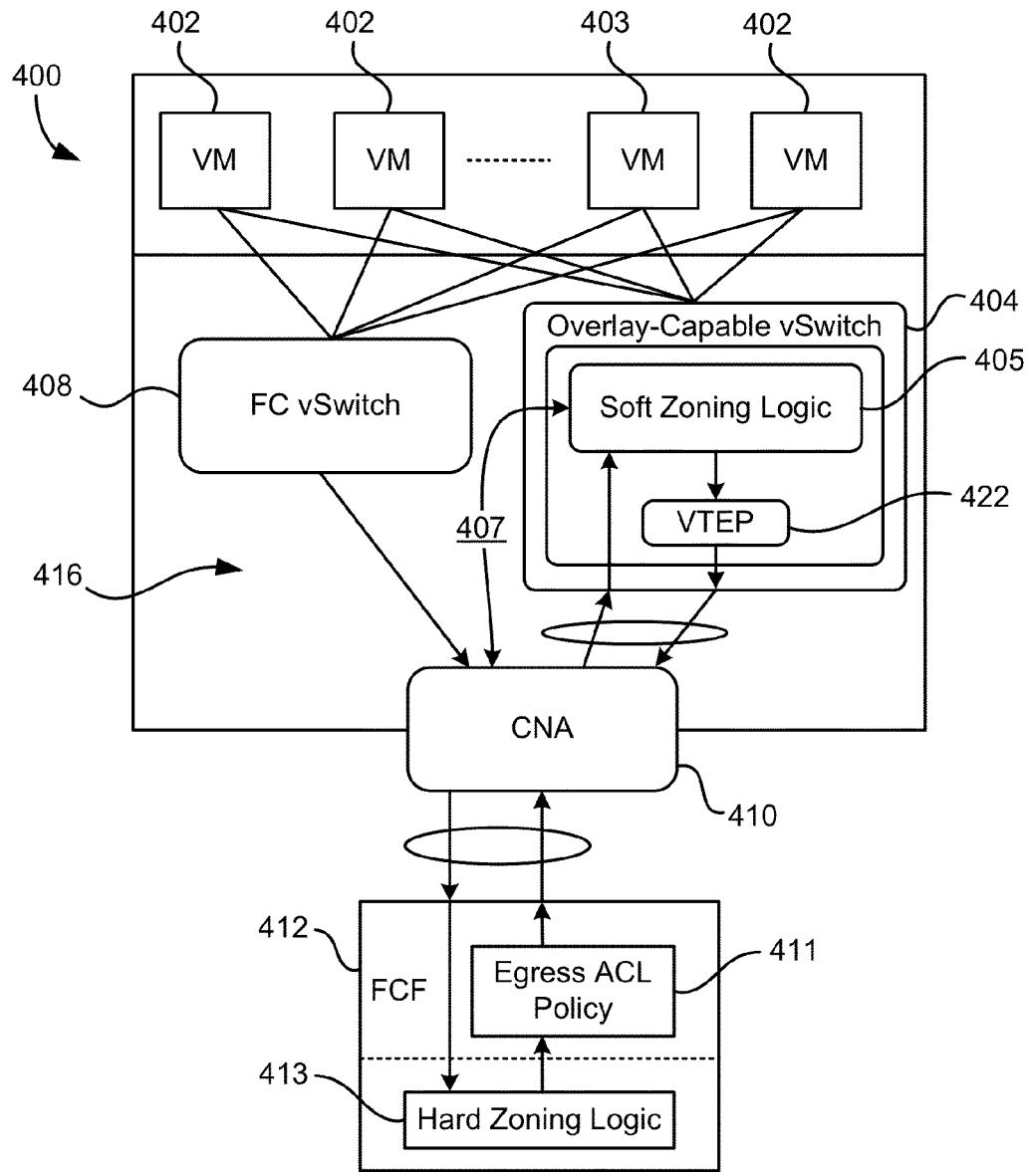
FIG. 8 shows soft zoning in the system, according to one embodiment.

An implementation which accounts for Soft Zoning is shown in FIG. 8, according to one embodiment. In order to account for Soft Zoning, each Name Server query from a VM 403 to find a logged FC Target may be snooped by the FCoE_PM resident in the overlay-capable vSwitch 404 in Soft Zoning logic 405. The FCoE_PM may verify whether the FC Target device is visible in the Name Server database. Based on the visibility, the Name Service request may be ACCepted or REJected (generally, it will be ACCepted if the name exists, and REJected if the name does not exist in the Name Server Database), thereby limiting visibility of devices upstream of the FCoE_PM.

In some approaches, the FCoE_PM may make use of Registered State Change Notifications (RSCNs) to update its Name Server Database view, which at some point is copied from the Name Server Database stored elsewhere. In another approach, the FCoE_PM Soft Zoning logic 405 may interface with the CNA 410 to register for and receive a copy of RSCNs coming from the FC Fabric 418 to the CNA 410, as shown by communication 407.

Various embodiments described herein make mention of an overlay-encapsulated FCoE frame. According to one implementation, the overlay protocol may be VXLAN, and the overlay-encapsulated FCoE frame format may be as shown below.

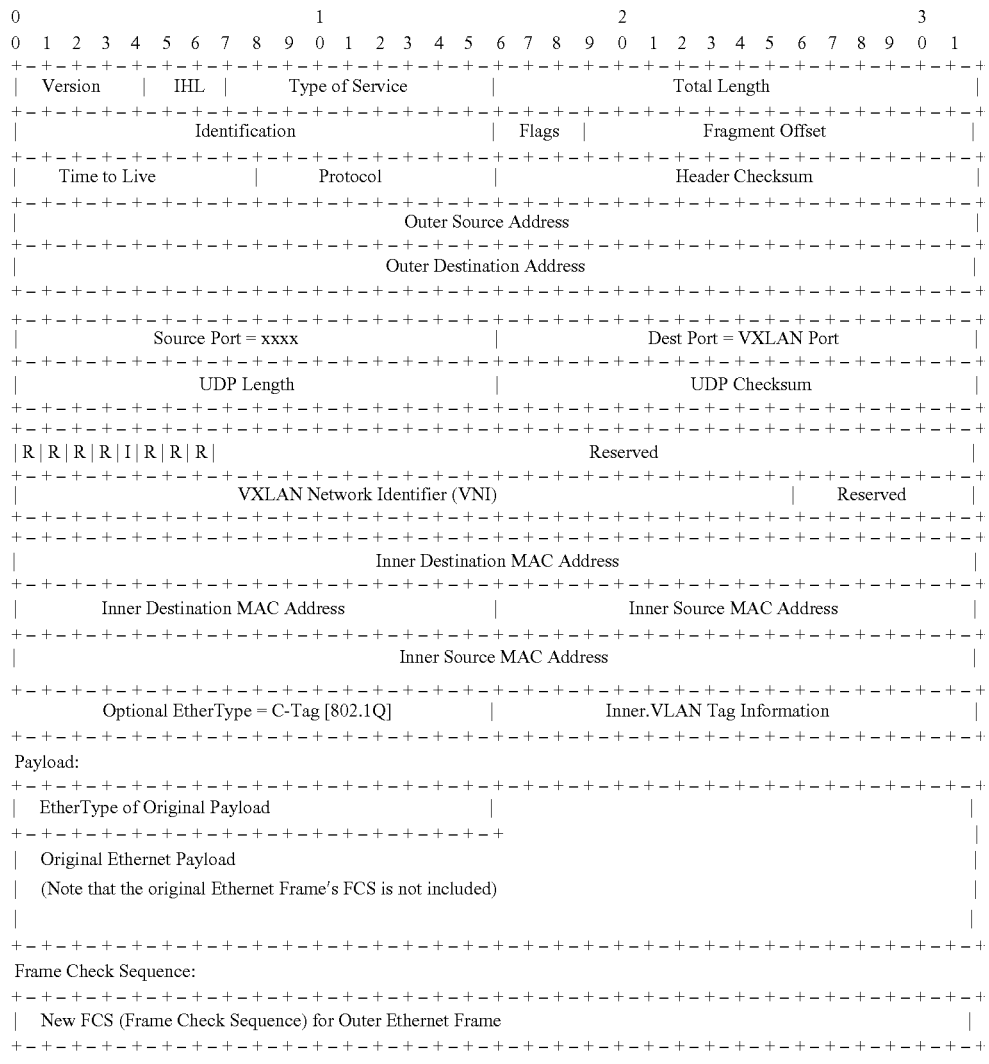

Of course, other frame formats may be used for other overlay technologies besides VXLAN, or other possible frame formats may be used for VXLAN implementations, in various embodiments.

Figure 10:
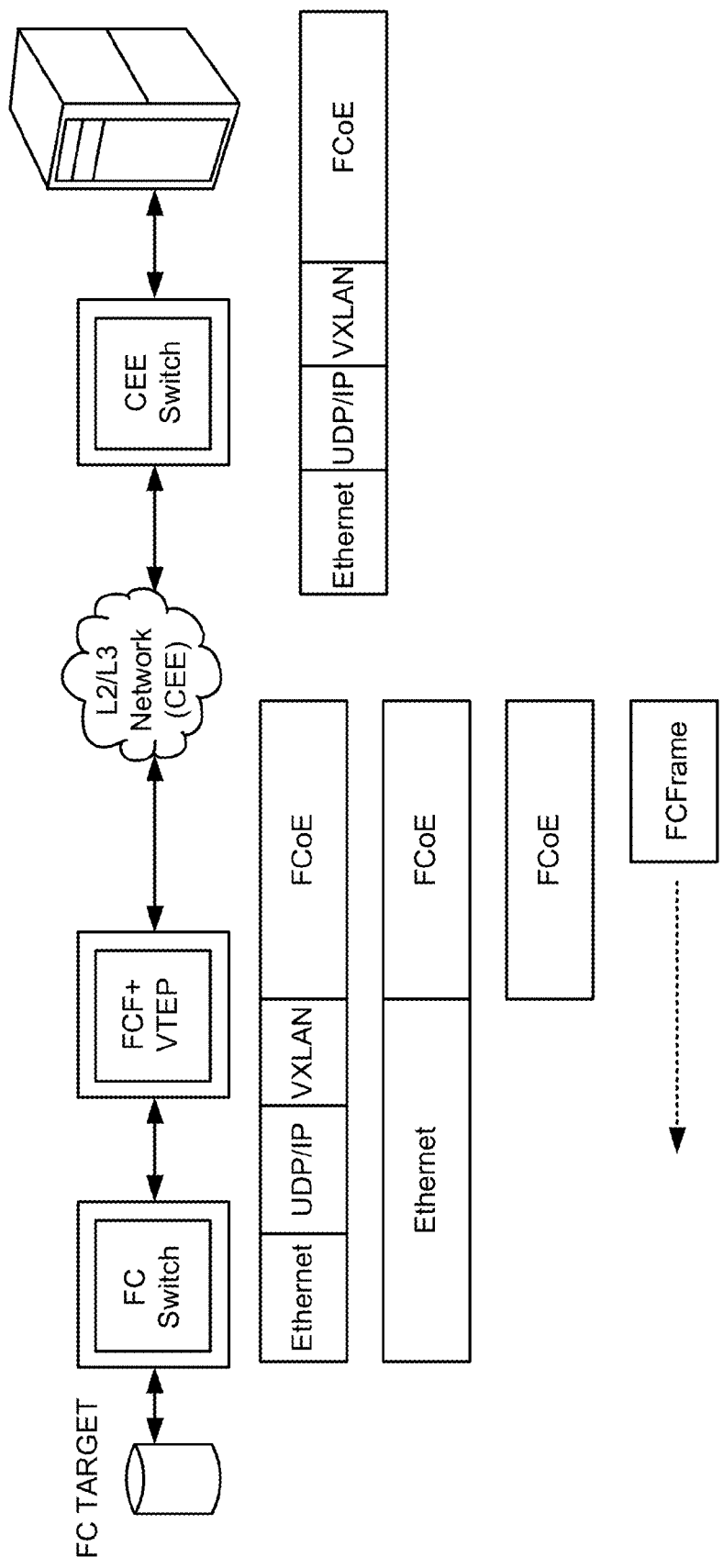
FIG. 10 shows address mapping, according to one embodiment.

FIG. 10 shows several stages of FC to FCoE to overlay (VXLAN) to IP address mapping, according to one embodiment. Of course, other methods of address mapping may be used and other protocols besides FCoE and VXLAN, according to various embodiments, as would be understood by one of skill in the art upon reading the present descriptions.

Figure 9:
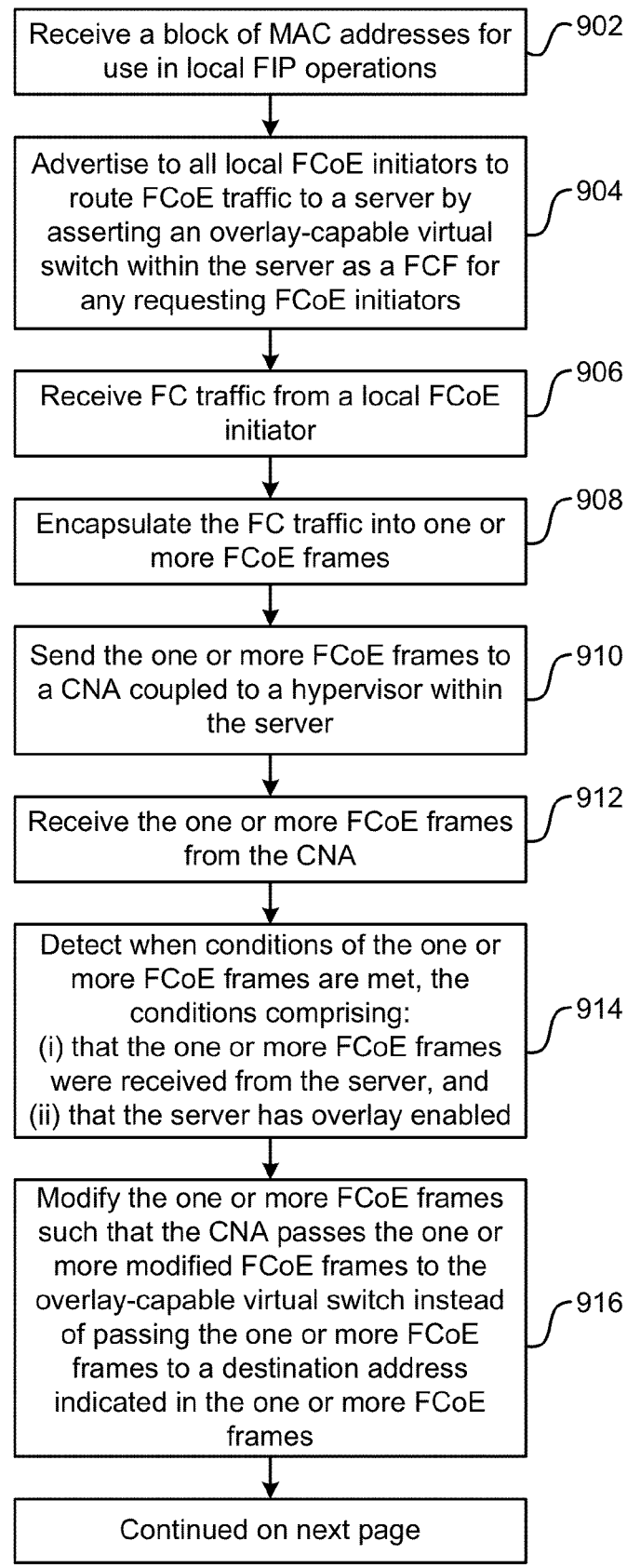
FIG. 9 is a flowchart of a method, according to one embodiment.
Figure 9:
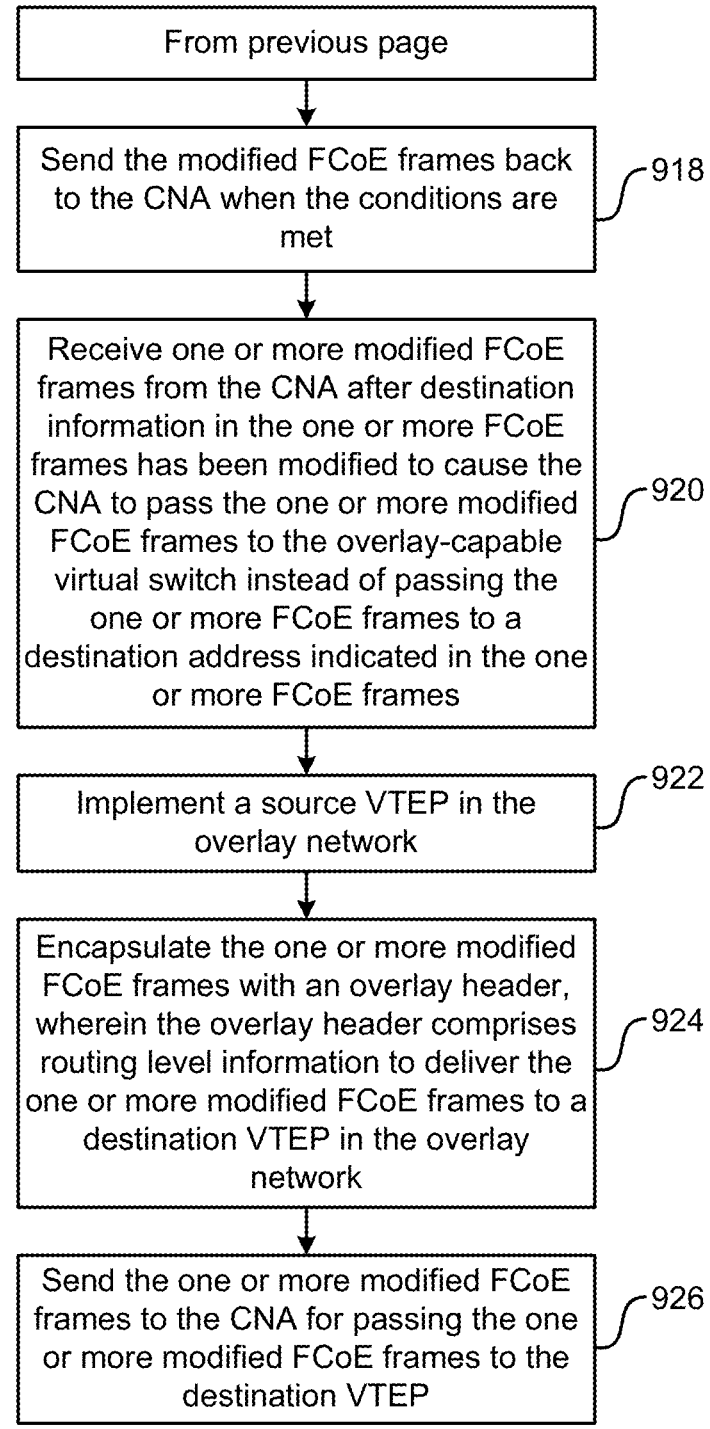

Now referring to FIG. 9, a flowchart of a method 900 for sending FCoE traffic over an overlay network is shown, according to one embodiment. The method 900 may be performed in accordance with the present invention in any of the environments depicted in FIGS. 1-8, among others, in various embodiments. Of course, more or less operations than those specifically described in FIG. 9 may be included in method 900, as would be understood by one of skill in the art upon reading the present descriptions.

Each of the steps of the method 900 may be performed by any suitable component of the operating environment. For example, in one embodiment, the method 900 may be partially or entirely performed by an overlay switch, a processor (such as a CPU, an ASIC, a FPGA, etc.), an end point station (such as a Hypervisor, virtual overlay network gateway, overlay switch capable of originating or terminating a tunnel, etc.), or computer program code embedded in a computer readable storage medium, in various non-limiting approaches.

As shown in FIG. 9, method 900 may initiate with operation 902, where a block of MAC addresses for use in local FIP operations are received, possibly by an overlay-capable vSwitch in a server.

In operation 904, it is advertised to all local FCoE initiators to route FCoE traffic to a server by asserting the overlay-capable vSwitch within the server as a FCF for any requesting FCoE initiators.

In optional operation 906, FC traffic may be received, possibly by the overlay-capable vSwitch, from a local FCoE initiator, such as a local VM on the server.

In optional operation 908, the FC traffic is encapsulated into one or more FCoE frames, such as by using an encapsulation/de-capsulation engine in the overlay-capable vSwitch on the server.

In optional operation 910, the one or more FCoE frames are sent to a CNA coupled to a hypervisor within the server, possibly by the overlay-capable vSwitch. The hypervisor may be running the overlay-capable vSwitch on the server.

In optional operation 912, the one or more FCoE frames are received from the CNA, possibly by a FCF, that is in communication with the CNA.

In optional operation 914, it is detected when conditions of the one or more FCoE frames are met, possibly by the FCF. Any conditions may be checked, but in one embodiment, the conditions comprise: (i) that the one or more FCoE frames were received from the server, and (ii) that the server has overlay enabled, which may be detected from the management plane.

In optional operation 916, the one or more FCoE frames are modified, possibly by the FCF, such that the CNA passes the one or more modified FCoE frames to the overlay-capable vSwitch instead of passing the one or more FCoE frames to a destination address indicated in the one or more FCoE frames. This may be performed each time, or only when the conditions are met.

In optional operation 918, the modified FCoE frames are sent back to the CNA when the conditions are met, possibly by the FCF.

In optional operation 920, one or more modified FCoE frames are received from the CNA, possibly by the overlay-capable vSwitch in the server, after destination information in the one or more FCoE frames has been modified to cause the CNA to pass the one or more modified FCoE frames to the overlay-capable vSwitch instead of passing the one or more FCoE frames to a destination address indicated in the one or more FCoE frames.

In optional operation 922, a source VTEP is implemented in the overlay network, such as by the overlay-capable vSwitch.

In optional operation 924, the one or more modified FCoE frames are encapsulated with an overlay header, wherein the overlay header comprises routing level information to deliver the one or more modified FCoE frames to a destination VTEP in the overlay network. This may be performed by the overlay-capable vSwitch in the server.

In optional operation 926, the one or more modified FCoE frames are sent to the CNA for passing the one or more modified FCoE frames to the destination VTEP.

Referring again to FIG. 9, according to further embodiments, method 900 may be executed from a computer program product using a processor capable of executing such computer readable program code. For example, a computer program product may include a computer readable storage medium having computer readable program code embodied therewith. The computer readable program code may comprise some or all of: computer readable program code configured for receiving a block of MAC addresses for use in local FIP operations; computer readable program code configured for advertising to all local FCoE initiators to route FCoE traffic to a FC virtual switch by asserting the overlay-capable virtual switch as a FCF for any requesting FCoE initiators; computer readable program code configured for receiving one or more modified FCoE frames from a CNA coupled to a hypervisor after destination information in one or more FCoE frames has been modified to cause the CNA to pass the one or more modified FCoE frames to the overlay-capable virtual switch instead of passing the one or more FCoE frames to a destination address indicated in the one or more FCoE frames; computer readable program code configured for implementing a source VTEP in an overlay network; computer readable program code configured for encapsulating the one or more modified FCoE frames with an overlay header, wherein the overlay header comprises routing level information to deliver the one or more modified FCoE frames to a destination VTEP in the overlay network; and/or computer readable program code configured for sending the one or more modified FCoE frames to the CNA for passing the one or more modified FCoE frames to the destination VTEP.

There are several advantages over conventional techniques that are gained by embedding SAN frames into an overlay header and transmitting the frames via one or more tunnels over an overlay network. This technique may provide VXLAN enablement to carry FCoE traffic, FCoE traffic may make use of all the advantages of VXLAN technology, such as multipath I/O, maximizing link utilization, eliminating the use of spanning tree protocol (STP), etc., it enables FCoE to be "routable" across L2 domains, L3 addressing removes restrictions on FCoE single hop boundaries, it provides "MultiHop" FCoE without any special hardware requirements, and it enables VMs hosting SAN applications to move seamlessly across L3 networks. Of course, other advantages may be possible which are not specifically described herein.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
   a server, comprising:
      a hypervisor layer, comprising:
         an overlay-capable virtual switch; and
         a Fibre Channel (FC) virtual switch;
      at least one processor configured to execute logic; and
      a converge network adapter (CNA) coupled to the hypervisor, the CNA being configured to communicate with the overlay-capable virtual switch and the FC virtual switch, and wherein the CNA is configured to communicate with a FC forwarder (FCF),
   wherein the overlay-capable virtual switch comprises logic configured to communicate with a central controller,
   wherein the FC virtual switch comprises:
      logic configured to receive FC traffic from a local FCoE initiator;
      logic configured to encapsulate the FC traffic into one or more FCoE frames; and
      logic configured to send the one or more FCoE frames to the CNA, and
   wherein the overlay-capable virtual switch comprises:
      logic configured to receive one or more modified FCoE frames from the CNA after destination information in the one or more FCoE frames has been modified to cause the CNA to pass the one or more modified FCoE frames to the overlay-capable virtual switch instead of passing the one or more FCoE frames to a destination address indicated in the one or more FCoE frames;
      logic configured to implement a source virtual tunneling end point (VTEP) in an overlay network;
      logic configured to encapsulate the one or more modified FCoE frames with an overlay header, wherein the overlay header comprises routing level information to deliver the one or more modified FCoE frames to a destination VTEP in the overlay network; and logic configured to send the one or more modified FCoE frames to the CNA for passing the one or more modified FCoE frames to the destination VTEP.

2. The system as recited in claim 1, further comprising one or more virtual machines (VMs), each VM being capable of generating storage traffic and Enterprise networking traffic.

3. The system as recited in claim 1, wherein the overlay-capable virtual switch operates according to Distributed Overlay Virtual Ethernet (DOVE) standards.

4. The system as recited in claim 1, wherein the CNA is further configured to connect to a Fibre Channel forwarder (FCF), the FCF being connected to a Fibre Channel fabric and a Layer-2/Layer-3 (L2/L3) network.

5. The system as recited in claim 1, wherein the overlay-capable virtual switch further comprises:

logic configured to receive a block of media access control (MAC) addresses for use in local fabric initialization protocol (FIP) operations; and logic configured to advertise to all local Fibre Channel over Ethernet (FCoE) initiators to route FCoE traffic to the server by asserting the overlay-capable virtual switch as a Fibre Channel forwarder (FCF) for any requesting FCoE initiators.

6. The system as recited in claim 5, wherein the central controller is a Distributed Overlay Virtual Ethernet (DOVE) controller, wherein the local FIP operations comprise assigning MAC addresses to local FCoE initiators, and wherein the block of MAC addresses is received from the DOVE controller.

7. The system as recited in claim 1, further comprising one or more virtual machines (VMs), each VM being capable of generating storage traffic and Enterprise networking traffic.

8. A system, comprising:
a Fibre Channel (FC) forwarder (FCF); and
a server, comprising:
a hypervisor layer, comprising:
an overlay-capable virtual switch; and
a FC virtual switch;
at least one processor configured to execute logic; and
a converge network adapter (CNA) coupled to the hypervisor, the CNA being configured to communicate with the overlay-capable virtual switch and the FC virtual switch, and wherein the CNA is configured to communicate with the FCF,
wherein the overlay-capable virtual switch comprises logic configured to communicate with a central controller, and
wherein the FCF comprises:
logic configured to receive the one or more FCoE frames from the CNA;
logic configured to detect when conditions of the one or more FCoE frames are met, the conditions comprising:
that the one or more FCoE frames were received from the server; and
that the server has overlay enabled;
logic configured to modify the one or more FCoE frames such that the CNA passes the one or more modified FCoE frames to the overlay-capable virtual switch instead of passing the one or more FCoE frames to a destination address indicated in the one or more FCoE frames; and logic configured to send the modified FCoE frames back to the CNA when the conditions are met.

9. A computer program product, the computer program product comprising a non-transitory computer readable storage medium having computer readable program code embodied therewith, the computer readable program code comprising:

computer readable program code configured to receive a block of media access control (MAC) addresses for use in local fabric initialization protocol (FIP) operations;

computer readable program code configured to advertise to all local Fibre Channel over Ethernet (FCoE) initiators to route FCoE traffic to a Fibre Channel (FC) virtual switch by asserting the overlay-capable virtual switch as a Fibre Channel forwarder (FCF) for any requesting FCoE initiators;

computer readable program code configured to receive FC traffic from a local FCoE initiator;

computer readable program code configured to encapsulate the FC traffic into one or more FCoE frames; and computer readable program code configured to send the one or more FCoE frames to the CNA;

wherein the overlay-capable virtual switch comprises:

computer readable program code configured to receive one or more modified FCoE frames from the CNA after destination information in the one or more FCoE frames has been modified to cause the CNA to pass the one or more modified FCoE frames to the overlay-capable virtual switch instead of passing the one or more FCoE frames to a destination address indicated in the one or more FCoE frames;

computer readable program code configured to implement a source virtual tunneling end point (VTEP) in an overlay network;

computer readable program code configured to encapsulate the one or more modified FCoE frames with an overlay header, wherein the overlay header comprises routing level information to deliver the one or more modified FCoE frames to a destination VTEP in the overlay network; and computer readable program code configured to send the one or more modified FCoE frames to the CNA for passing the one or more modified FCoE frames to the destination VTEP.

10. The computer program product as recited in claim 9, further comprising:

computer readable program code configured for receiving one or more modified FCoE frames from a converge network adapter (CNA) coupled to a hypervisor after destination information in one or more FCoE frames has been modified to cause the CNA to pass the one or more modified FCoE frames to the overlay-capable virtual switch instead of passing the one or more FCoE frames to a destination address indicated in the one or more FCoE frames;

computer readable program code configured for implementing a source virtual tunneling end point (VTEP) in an overlay network;

computer readable program code configured for encapsulating the one or more modified FCoE frames with an overlay header, wherein the overlay header comprises routing level information to deliver the one or more modified FCoE frames to a destination VTEP in the overlay network; and computer readable program code configured for sending the one or more modified FCoE frames to the CNA for passing the one or more modified FCoE frames to the destination VTEP.

11. A system, comprising:
a server, comprising:
  a hypervisor layer, comprising:
    an overlay-capable virtual switch; and
    a Fibre Channel (FC) virtual switch;
  at least one processor configured to execute logic; and
  a converge network adapter (CNA) coupled to the hypervisor, the CNA being configured to communicate with the overlay-capable virtual switch and the FC virtual switch, and wherein the CNA is configured to communicate with a FC forwarder (FCF),
wherein the overlay-capable virtual switch comprises:
  logic configured to communicate with a Distributed Overlay Virtual Ethernet (DOVE) controller;
  logic configured to receive a block of media access control (MAC) addresses for use in local fabric initialization protocol (FIP) operations from the DOVE controller; and
  logic configured to advertise to all local Fibre Channel over Ethernet (FCoE) initiators to route FCoE traffic to the server by asserting the overlay-capable virtual switch as a Fibre Channel forwarder (FCF) for any requesting FCoE initiators; and
the FCF, wherein the FCF comprises:
  logic configured to receive the one or more FCoE frames from the CNA;
  logic configured to detect when conditions of the one or more FCoE frames are met, the conditions comprising:
    that the one or more FCoE frames were received from the server; and
    that the server has overlay enabled;
  logic configured to modify the one or more FCoE frames such that the CNA passes the one or more modified FCoE frames to the overlay-capable virtual switch instead of passing the one or more FCoE frames to a destination address indicated in the one or more FCoE frames; and
  logic configured to send the modified FCoE frames back to the CNA when the conditions are met.

12. The system as recited in claim 11, further comprising one or more virtual machines (VMs), each VM being capable of generating storage traffic and Enterprise networking traffic.

13. The system as recited in claim 11, wherein the CNA is further configured to connect to the FCF, the FCF being connected to a Fibre Channel fabric and a Layer-2/Layer-3 (L2/L3) network.

14. The system as recited in claim 11,
wherein the FC virtual switch comprises:
  logic configured to receive FC traffic from a local FCoE initiator;
  logic configured to encapsulate the FC traffic into one or more FCoE frames; and
  logic configured to send the one or more FCoE frames to the CNA;
wherein the overlay-capable virtual switch comprises:
  logic configured to receive one or more modified FCoE frames from the CNA after destination information in the one or more FCoE frames has been modified to cause the CNA to pass the one or more FCoE frames to the overlay-capable virtual switch instead of passing the one or more FCoE frames to a destination address indicated in the one or more FCoE frames;
  logic configured to implement a source virtual tunneling end point (VTEP) in an overlay network;
  logic configured to encapsulate the modified FC traffic with an overlay header, wherein the overlay header comprises routing level information to deliver the one or more FCoE frames to a destination VTEP in the overlay network; and
  logic configured to send the one or more FCoE frames to the CNA for passing the one or more FCoE frames to the destination VTEP.

* * * * *